United States Patent
Jacobson et al.

(10) Patent No.: US 9,697,388 B1
(45) Date of Patent: Jul. 4, 2017

(54) UNFOLDABLE OLED READER/DISPLAYS FOR THE VISUALLY-IMPAIRED

(71) Applicant: Bank of America Corporation, Charlotte, NC (US)

(72) Inventors: William P. Jacobson, Matthews, NC (US); Dion Bellamy, Valley Park, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/181,632

(22) Filed: Jun. 14, 2016

(51) Int. Cl.
*G06K 7/00* (2006.01)
*G06K 19/077* (2006.01)
*G06K 19/07* (2006.01)
*G06K 19/02* (2006.01)

(52) U.S. Cl.
CPC ......... *G06K 7/0086* (2013.01); *G06K 19/025* (2013.01); *G06K 19/0704* (2013.01); *G06K 19/07705* (2013.01); *G06K 19/07722* (2013.01)

(58) Field of Classification Search
None
See application file for complete search history.

(56) References Cited

U.S. PATENT DOCUMENTS

| | | |
|---|---|---|
| 3,703,864 A | 11/1972 | Bradford |
| 3,946,206 A | 3/1976 | Darjany |
| 5,693,956 A | 12/1997 | Shi et al. |
| 5,734,154 A | 3/1998 | Jachimowicz et al. |
| 5,770,849 A | 6/1998 | Novis et al. |
| 6,015,092 A * | 1/2000 | Postlewaite .......... G06K 7/0013 235/486 |
| 6,173,899 B1 | 1/2001 | Rozin |
| 7,025,277 B2 | 4/2006 | Forrest et al. |
| 7,270,276 B2 | 9/2007 | Vayssiere |

(Continued)

FOREIGN PATENT DOCUMENTS

| | | |
|---|---|---|
| DE | 102009028991 | 8/2009 |
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Kristy A Haupt
(74) *Attorney, Agent, or Firm* — Weiss & Arons LLP; Michael A. Springs, Esq.

(57) ABSTRACT

A method for displaying information printed on a contactless smart card is provided. The method may include using a wireless chip to enable communication with the contactless smart card. The method may further include displaying the information on a plurality of panels. Each of the panels may include an array of organic light emitting diodes ("OLEDs"). Each of the panels may be coupled to at least one other panel. The method may further include coordinating the transfer of the information from the contactless smart card to the wireless chip using a software chip. The software chip may include a non-transitory memory and a processor. The method may yet further include powering, either directly or indirectly, the plurality of panels, the software chip and the contactless smart card, said powering using a battery.

16 Claims, 15 Drawing Sheets

(56) References Cited

U.S. PATENT DOCUMENTS

| | | | |
|---|---|---|---|
| 7,360,682 | B2 | 4/2008 | Shane et al. |
| 7,523,856 | B2 | 4/2009 | Block et al. |
| 7,588,183 | B2 | 9/2009 | Shane et al. |
| 7,791,559 | B2 | 9/2010 | Piasecki |
| 7,814,016 | B2 | 10/2010 | Pranger |
| 7,856,116 | B2 | 12/2010 | Rodriguez et al. |
| 7,940,159 | B2 | 5/2011 | Clemens et al. |
| 7,992,789 | B2 | 8/2011 | Borracci |
| 8,237,068 | B2 | 8/2012 | Szaikowski |
| 8,276,823 | B2 | 10/2012 | Chen |
| 8,317,094 | B2 | 11/2012 | Lehman |
| 8,378,932 | B2 | 2/2013 | Fein et al. |
| 8,392,965 | B2 | 3/2013 | Carter et al. |
| 8,399,889 | B2 | 3/2013 | Wu et al. |
| 8,413,893 | B2 | 4/2013 | Kim |
| 8,471,782 | B2 | 6/2013 | Muklashy et al. |
| 8,523,059 | B1 | 9/2013 | Mullen et al. |
| 8,540,151 | B1 | 9/2013 | Snyder et al. |
| 8,678,293 | B2 | 3/2014 | Chen |
| 8,756,680 | B2 | 6/2014 | Shashidhar |
| 8,810,816 | B2 | 8/2014 | Fischer et al. |
| 2005/0134461 | A1 | 6/2005 | Gelbman et al. |
| 2006/0131393 | A1 | 6/2006 | Cok et al. |
| 2007/0273507 | A1 | 11/2007 | Burchell et al. |
| 2007/0279315 | A1 | 12/2007 | Laves et al. |
| 2008/0035736 | A1 | 2/2008 | Tompkin et al. |
| 2008/0158150 | A1 | 7/2008 | Rossman et al. |
| 2009/0039154 | A1* | 2/2009 | Williams ............... G06K 19/04 235/380 |
| 2010/0260388 | A1 | 10/2010 | Garrett et al. |
| 2010/0302206 | A1 | 12/2010 | Yu et al. |
| 2011/0060640 | A1 | 3/2011 | Thompson et al. |
| 2011/0140841 | A1 | 6/2011 | Bona et al. |
| 2011/0241996 | A1 | 10/2011 | Vesely |
| 2012/0280924 | A1* | 11/2012 | Kummer ............ H04M 1/0235 345/173 |
| 2013/0162594 | A1 | 6/2013 | Paulsen et al. |
| 2013/0232082 | A1 | 9/2013 | Krawczewicz et al. |
| 2014/0081729 | A1 | 3/2014 | Ocher |
| 2014/0093144 | A1 | 4/2014 | Feekes |
| 2014/0114861 | A1 | 4/2014 | Mages et al. |
| 2014/0172700 | A1 | 6/2014 | Teuwen et al. |
| 2014/0291406 | A1 | 10/2014 | Ko |
| 2014/0353384 | A1 | 12/2014 | Hoegerl et al. |
| 2015/0077646 | A1 | 3/2015 | Chen et al. |
| 2015/0262052 | A1 | 9/2015 | Pahuja |
| 2016/0004945 | A1 | 1/2016 | Wade |
| 2016/0054479 | A1 | 2/2016 | Ho et al. |
| 2016/0085325 | A1* | 3/2016 | Lee ................... G06K 9/00288 345/173 |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi: Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837-2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

* cited by examiner

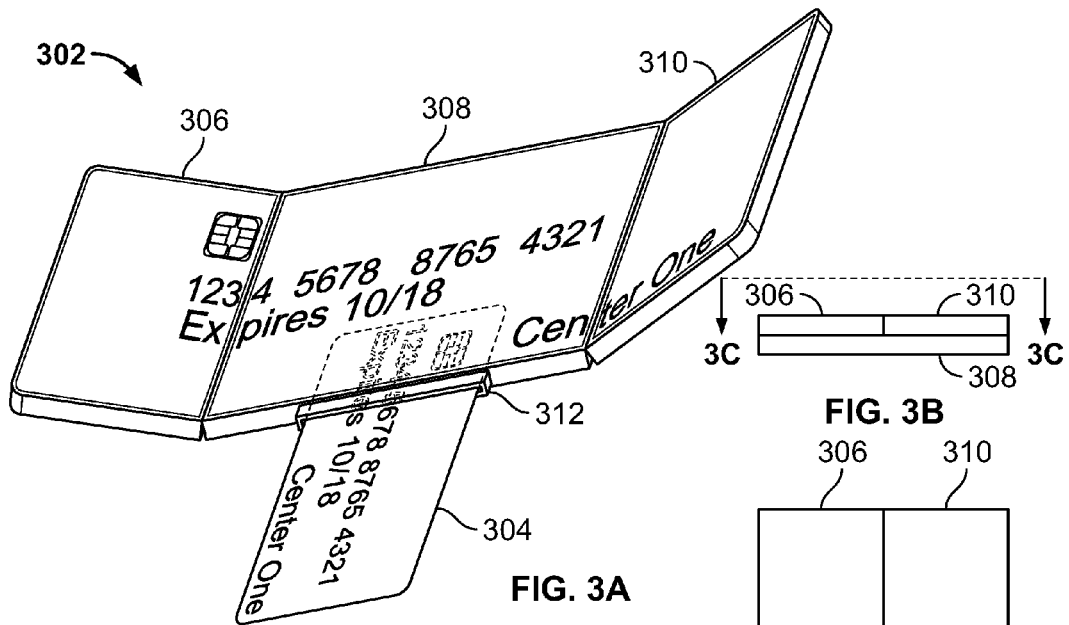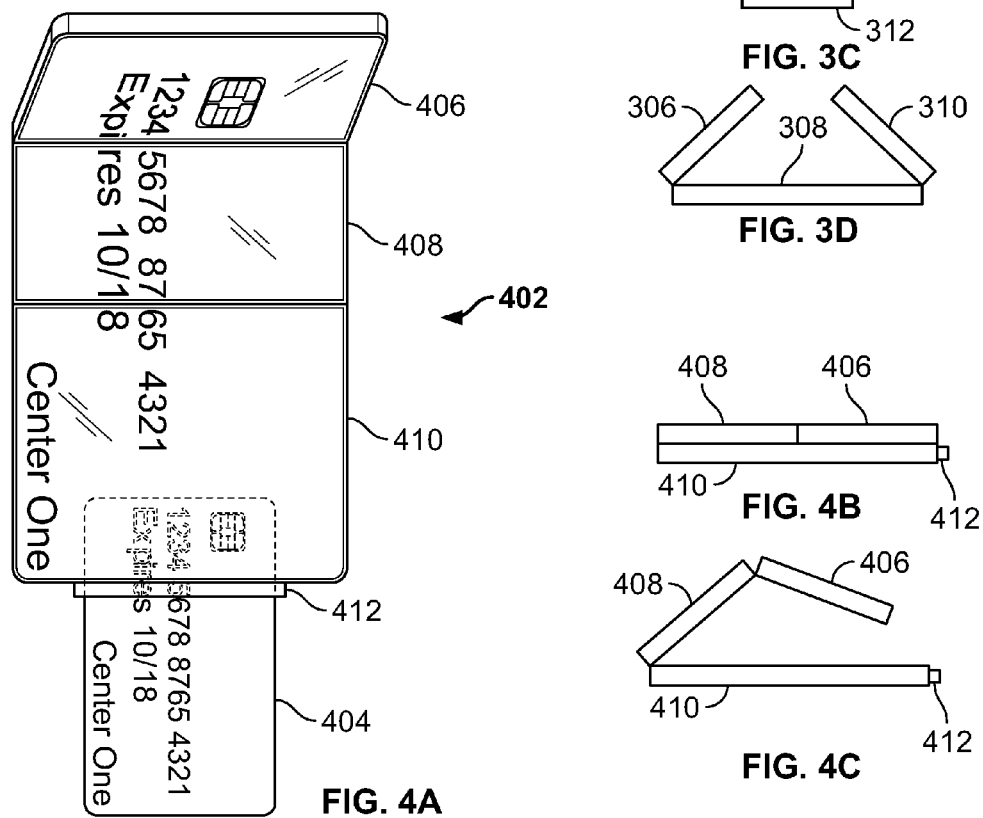

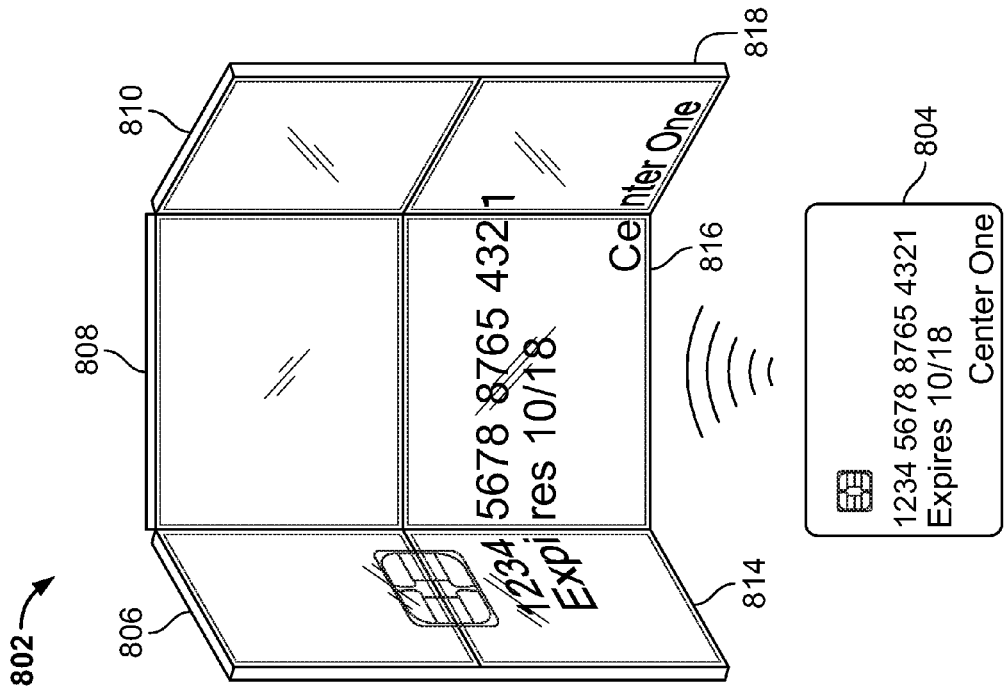
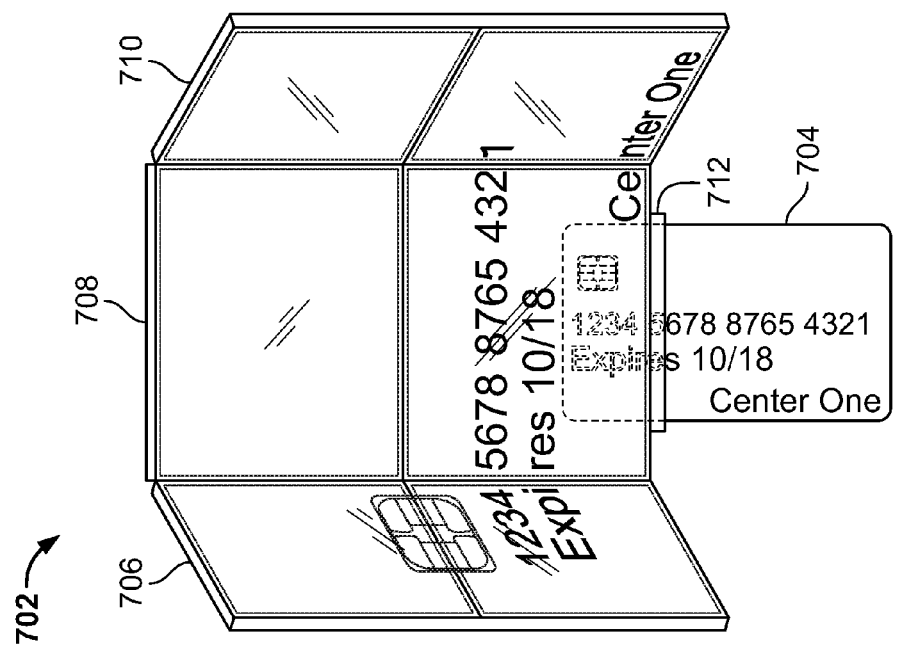

UNFOLDABLE OLED READER/DISPLAYS FOR THE VISUALLY-IMPAIRED

FIELD OF TECHNOLOGY

Aspects of the invention relate to visual displays for the visually-impaired.

BACKGROUND

Most consumer and business transactions require transfer of credit card or debit card information. However, electronic transfer—e.g., by e-mail or via an Internet portal—of credit card or debit card information involve well-known security risks. One method of mitigating such risks is to consummate transactions over the phone and transfer the credit card or debit card information using interpersonal communication. When using interpersonal communication to purchase an object from a vendor, a buyer must inform the vendor as to his intended purchase, retrieve his or her credit card from his or her wallet and then verbally communicate the information printed and/or embossed on the credit card to the vendor.

For the visually-impaired, however, retrieving a credit card or debit card and relatively quickly and accurately reading the information written on the card may be difficult. These actions may be further complicated in the context of a telephonic purchase. Furthermore, sub-optimal environmental conditions such as poor light conditions or, in an external setting, poor weather conditions may adversely affect the ability of the visually-impaired purchaser to retrieve the necessary information.

It would be desirable to provide a device that enables a user to quickly and easily read the information on an EMV-technology-equipped credit card or a debit card (referred to herein, collectively, as a "smart card").

It would be further desirable to provide a device that mitigates sub-optimal environmental conditions that may adversely affect the ability of a user to read debit and/or credit card information.

SUMMARY OF THE DISCLOSURE

A smart card reader and display is provided. The smart card reader may enable reading information from contact EMV-technology-equipped smart cards. The reader may include a plurality of panels. Each of the panels may include an array of organic light emitting diodes ("OLEDs") forming one or more pixels. Each of the panels may coupled to at least one other panel. The reader and display may preferably include a wireless chip and a software chip. The software chip may include a non-transitory memory and a processor. The reader and display may also include a battery for powering the plurality of panels, the wireless device and the software chip. The battery may also be used to inductively power the smart card.

The reader may also include at least six contacts for contacting six smart card contacts. The six contacts may preferably be located proximal an edge of the smart card reader and display. The six contacts may include a first contact for contacting a power supply contact of a smart card, a second contact for contacting a reset contact of a smart card, a third contact for contacting a clock ("clk") contact of a smart card, a fourth contact for contacting a ground contact of a smart card, a fifth contact for contacting a programming voltage contact of a smart card, and a sixth contact for contacting a serial input and output contact of a smart card.

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which:

FIGS. 3A-3D show a multi-panel reader and display according to certain embodiments;

FIGS. 4A-4C show another multi-panel reader and display according to certain embodiments;

FIG. 7 shows yet another multi-panel reader and display according to certain embodiments;

FIG. 8 shows a multi-panel reader and display in contactless communication with a smart card according to certain embodiments;

DETAILED DESCRIPTION OF THE DISCLOSURE

Figure 1:
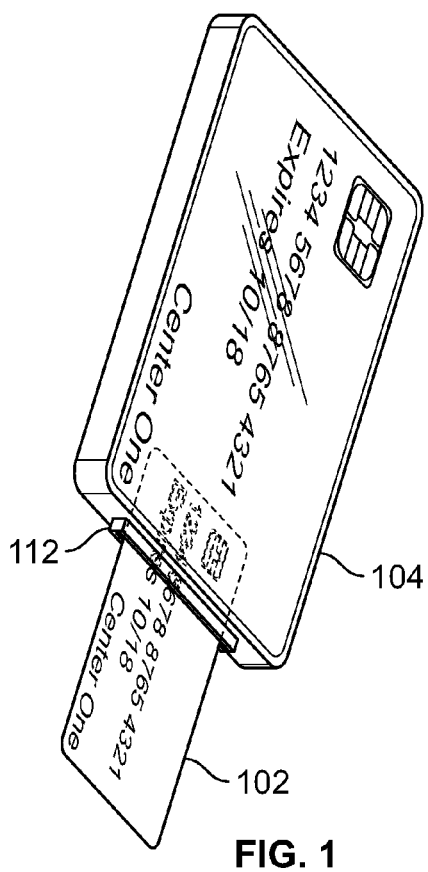
FIG. 1 shows a reader and display according to certain embodiments.

Certain embodiments may include a smart card reader and display. The smart card reader may be used for reading contact EMV-technology-equipped smart cards. The reader and display may include a plurality of panels. Each of the panels may include an array of light emitting diodes, such as organic light emitting diodes ("OLEDs"). The array of diodes may form one or more pixels. Each of the panels may be coupled to at least one other panel.

The reader and display may preferably include a wireless chip and a software chip. The software chip may further include a non-transitory memory and a processor.

The reader and display may also include a battery for powering the OLED layer, the wireless device and the software chip.

The reader and display may also include at least six contacts for contacting six smart card contacts. The six contacts may be located proximal an edge of the smart card reader and display. The six contacts may include a first contact for contacting a power supply contact of a smart card, a second contact for contacting a reset contact of a smart card, a third contact for contacting a clock ("clk") contact of a smart card, a fourth contact for contacting a ground contact of a smart card, a fifth contact for contacting a programming voltage contact of a smart card, and a sixth contact for contacting a serial input and output ("I/O") contact of a smart card.

In some embodiments, the reader and display may include at least one additional contact for contacting at least one auxiliary contact on a smart card.

In certain embodiments, the reader and display may preferably include at least one contact-EMV-reader head selected from the group consisting of a pin type with card lock-reader head and a sled-type reader head. In such embodiments, the reader and display may preferably include an internally-mounted slot for receiving the smart card such that, when the smart card is placed in the slot, the contacts on the smart card are preferably securely in contact with the contacts on the contact-EMV reader.

In some embodiments, the display may be touch-sensitive. In the embodiments in which the display is touch-sensitive, the display may further enable push and pull technology. Such technology may preferably enable the user to enlarge and/or reduce a portion of the smart card on the display in response to touch. In embodiments where the card includes its own display—e.g., on the face of the card—the display may be enlarged or reduced as needed.

In certain embodiments, the plurality of panels may roughly correspond to the size of a conventional credit card or debit card which is at least 85.60×53.98 mm. It should be noted that, in some embodiments, the plurality of panels may be bigger, or smaller, individually or collectively, than a conventional credit or debit card.

In certain embodiments, the reader and display may further include backlighting as provided by one of the layers of the panels. The backlighting may be adjustable. In addition, contrast of the display may also be adjustable. It should be noted that backlighting may typically be included in displays other than OLED displays, but this does not preclude using backlighting in OLED displays.

In certain embodiments, the smart card reader and display may include a wireless chip that is configured to enable communication with a contactless smart card. Such a wireless chip may be in communication with a software chip.

In embodiments for communicating with a contactless smart card, the reader and display may also include an externally-mounted slot for receiving the contactless smart card such that, when the contactless smart card is positioned in the externally-mounted slot, the contactless smart card may be in communication range with the reader and display.

Some embodiments involve methods for displaying information printed on a contactless smart card. The methods may include using a wireless chip contained within the reader and display to enable communication with the contactless smart card. The methods may further include displaying the information on a plurality of panels. Each of the panels may include an array of light emitting diodes, such as, for example, OLEDs, or other suitable display mechanism. Each of the panels may be coupled to at least one other panel.

The methods may further include coordinating the transfer of the information from the contactless smart card to the wireless chip using a software chip. The method may also include powering, either directly or indirectly, the diode layer, the plurality of panels, the software chip, preferably inductively, and the contactless smart card using a battery.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A smart card, a panel, or a system according to certain embodiments may have a processor for controlling the operation of devices its associated components. The computer may include RAM, ROM, an input/output module, and/or a memory. The processor will also execute all software running on the computer—e.g., the operating system. Other components commonly used for computers such as EEPROM or Flash memory or any other suitable components may also be part of the computer.

The memory may be comprised of any suitable permanent storage technology—e.g., a hard drive. The memory stores software including the operating system, any application(s) along with any data needed for the operation of the system.

Alternatively, some or all of computer executable instructions may be embodied in hardware or firmware (not shown). The computer executes the instructions embodied by the software to perform various functions.

Input/output ("I/O") module may include connectivity to a microphone, keyboard, touch screen, and/or stylus through which a user of computer may provide input, and may also include one or more speakers for providing audio output and a video display device for providing textual, audiovisual and/or graphical output.

The system may be connected to other systems via a LAN interface.

The system may operate in a networked environment supporting connections to one or more remote computers. Terminals may be personal computers or servers that include many or all of the elements described above relative to the system. The network connections may include a local area network (LAN) and a wide area network (WAN), but may also include other networks.

When used in a LAN networking environment, the computer is connected to a LAN through a LAN interface or adapter. When used in a WAN networking environment, the computer may include a modem or other means for establishing communications over WAN, such as the Internet.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various web browsers can be used to display and manipulate data on web pages.

Additionally, application program(s), which may be used by computer, may include computer executable instructions for invoking user functionality related to communication, such as email, Short Message Service (SMS), and voice input and speech recognition applications.

The computer and/or terminals may also be devices including various other components, such as a battery, speaker, and antennas (not shown).

The terminals may be portable devices such as a laptop, cell phone, smart phone, table, or any other suitable device for storing, transmitting and/or transporting relevant information. The terminals may be other devices. These devices may be identical to the system or different therefrom. The differences may be related to hardware components and/or software components.

A computing machine according to the invention may include one or more chip modules, which may include one or more integrated circuits, and which may include logic configured to perform any other suitable logical operations.

Such a computing machine may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing devices, which may validate and/or filter incoming client information and instructions, communicate with client regarding same, query internal sub-entities regarding validation and execute and/or perform the instructions, and machine-readable memory.

The machine-readable memory may be configured to store in machine-readable data structures: information pertaining to a user, information pertaining to an account holder and the accounts which he may hold, the current time, information pertaining to historical client activity and/or any other suitable information or data structures.

Components of the computing machine may be coupled together by a system bus or other interconnections and may be present on one or more circuit boards. In some embodiments, the components may be integrated into a single chip. The chip may be silicon-based.

FIG. 1 shows an illustrative reader and display according to certain embodiments. Smart card 102 may preferably be inserted in internally-mounted port 112. It should be noted that port 112 should preferably be configured, along with an EMV reader stored within the reader and display 104, such that the EMV chip on card 102 may be inserted while a portion of the card remains external to the port. In some embodiments, however, reader and display 104 may preferably be equipped with internal actuators and/or wheels (not shown) such that card 102 may be completely inserted, or partially inserted and then further drawn, within reader and display 104. Thereafter, smart card 102 may be maintained within, or partially within the reader and display 104. Furthermore, card 102 may preferably be released upon a selection by user or in response to another signal.

Figure 2:
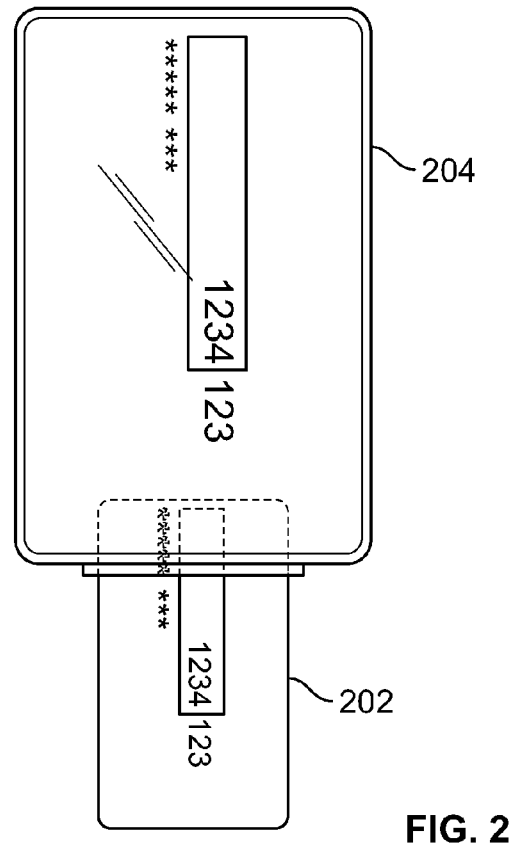
FIG. 2 shows a bottom plan view of the reader and display of FIG. 1.

FIG. 2 shows a bottom plan view of illustrative reader and display 204. It should be noted that, in preferred embodiments, the bottom of display 204 may preferably be equipped with a display additional to, and preferably separate from, a display on the top of reader and display 204. The bottom of display 204 should preferably be configured to show the back of card 202. In such embodiments, the bottom of display 204 should preferably be configured to show a display of the information shown on the back of card 202.

FIGS. 3A-3D show a multi-panel reader and display according to certain embodiments. FIG. 3A shows a perspective of a three-panel reader and display 302 according to certain embodiments. The panels shown in FIG. 3A include panels 306, 308 and 310. It should be noted that panels 306 and 308 are preferably configured to fold over to form a cover over larger, centered, panel 308.

Three-panel reader and display 302 may preferably have port 312 at the bottom edge in order to receive an EMV-equipped smart card 304. It should be noted that port 312 should preferably be large enough to receive the EMV and read it with appropriate hardware (such as, for example, the sled-type EMV reader head shown below in FIG. 9).

FIG. 3B shows a side view of reader and display 302 in a closed configuration. It should be noted that, in certain embodiments, reader and display 302 may preferably be configured such that, in a closed configuration the front of card 304 may be viewable from the viewable, when in a closed configuration, portions of panels 308 and 310 and the back of the card may be viewable only from the viewable portions, when in a closed configuration, of panel 308. While the general proportions of the card will have to be re-sized to fit the dimensions of the closed reader and display instead of the dimensions of the open reader and display, it should be noted that general dimensions of the displayed card may be changed as needed, without departing from the scope of the invention.

FIG. 3D shows a side view of a partially-opened display and reader 302. Panels 306 and 310 are shown in a partially-opened configuration.

FIGS. 4A-4C show another multi-panel reader and display 402 according to certain embodiments. Reader and display 402 preferably includes panels 406, 408 and 410. It should be noted that, whereas reader and display 302 shown in FIG. 3 preferably opens in a double clam-shell configuration, reader and display 304 preferably opens in a single clamshell configuration with a hinged in the top half of the clamshell. It should also be noted that, whereas port 312 shown in FIG. 3 is located at the bottom of relatively larger panel 308, port 412 is located on a side of relatively larger panel 412. In any case, the embodiments set forth herein do not require location of the port in any one particular location. It should be noted that, although hinges are described herein, because OLED displays may be folded and/or rolled, hinges may not be required on certain readers and displays that incorporate OLED displays.

FIG. 4B shows a side view of panels 406, 408 and 410 in a closed configuration. FIG. 4C shows a partially opened view of panels 406, 408 and 410, with bends shown in the hinge between panels 408 and 410 and panels 406 and 408. It should be noted that the hinges between two adjacent panels may preferably be formed by known methods and may accommodate electrical connections between one or more of the panels. Furthermore, as described in U.S. Patent Publication No. 2016/0085325, which is hereby incorporated by reference herein in its entirety.

Figure 5:
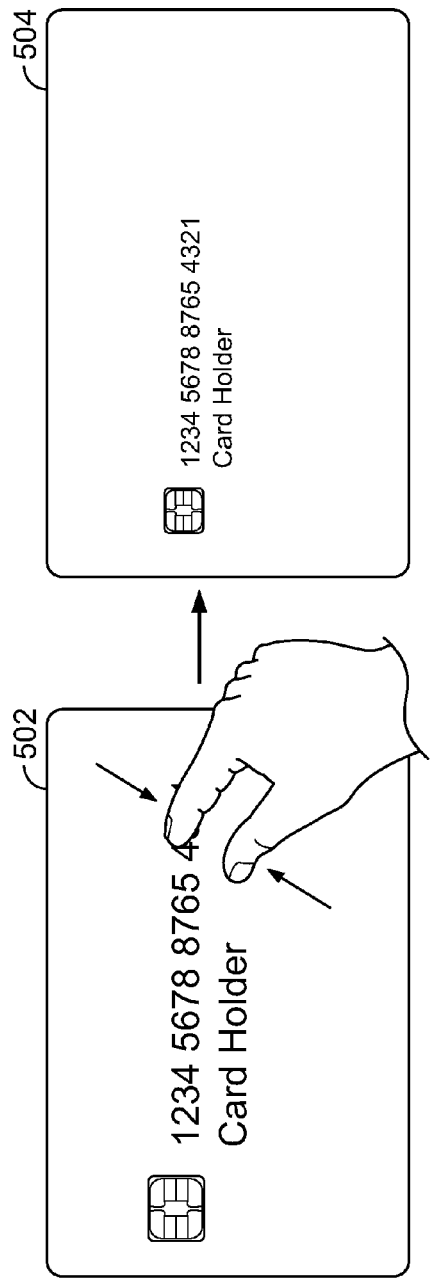
FIG. 5 shows a credit or debit card with an enabled touch display according to certain embodiments.

FIG. 5 shows a smart card 502 with an enabled touch display according to certain embodiments. FIG. 5 shows smart card 502 having its display "pulled" together in order to reduce the size of the display—i.e., zoom out—shown on smart card 504.

Figure 6:
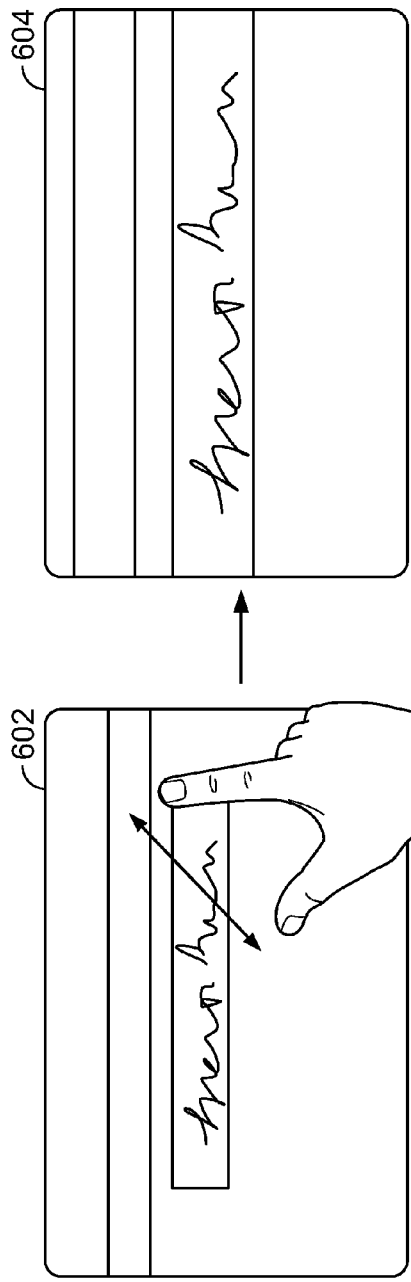
FIG. 6 shows another credit or debit card with an enabled touch display according to certain embodiments.

FIG. 6 shows another smart card 602 with an enabled touch display according to certain embodiments. FIG. 6 shows smart card 602 having its display "pushed" apart to enlarge the display—i.e., zoom in—shown on smart card 604. It should be noted that while standalone smart cards 502 and 602 incorporate push and pull technology, such technology may preferably be implemented on any one or multiple panels of any of the reader and displays described herein.

FIG. 7 shows yet another multi-panel reader and display 702 according to certain embodiments. It should be noted that each of panels 706, 708 and 710 may preferably be formed from a double panel in order to increase the size of the display in a yet greater fashion.

FIG. 8 shows a multi-panel reader and display 802 in contactless communication with a smart card according to certain embodiments. In such embodiments, the port shown in FIGS. 1-7 has been preferably substituted for an on-board antenna and transceiver for communicating with contactless card 804. Panels 806, 808, 810, 814, 816 and 818 preferably display the credit card information in response to a contactless (also referred to herein as "wireless") communication with contactless-enabled card 804.

Figure 9:
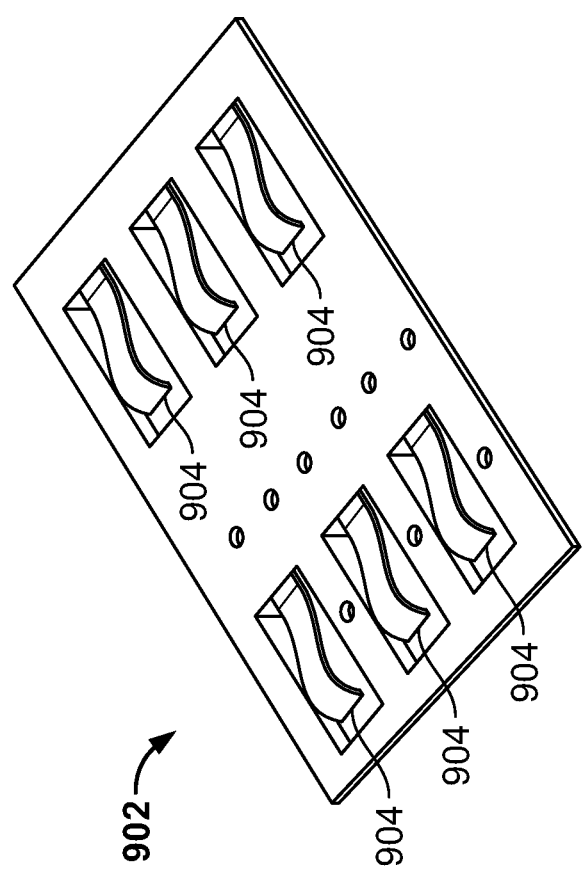
FIG. 9 shows a sled-type EMV reader head for use with certain embodiments of the invention.

FIG. 9 shows an exemplary sled-type EMV reader head 902 for use with certain embodiments of the invention. Reader head 902 may preferably include contacts 904. Contacts such as contacts 904 may preferably be stored internally to a display and reader according to certain embodiments.

It should be noted that all of the embodiments set forth in this application are, to the extent possible, preferably complementary of one another and may be used together in yet further embodiments as is suitable.

Figure 10A:
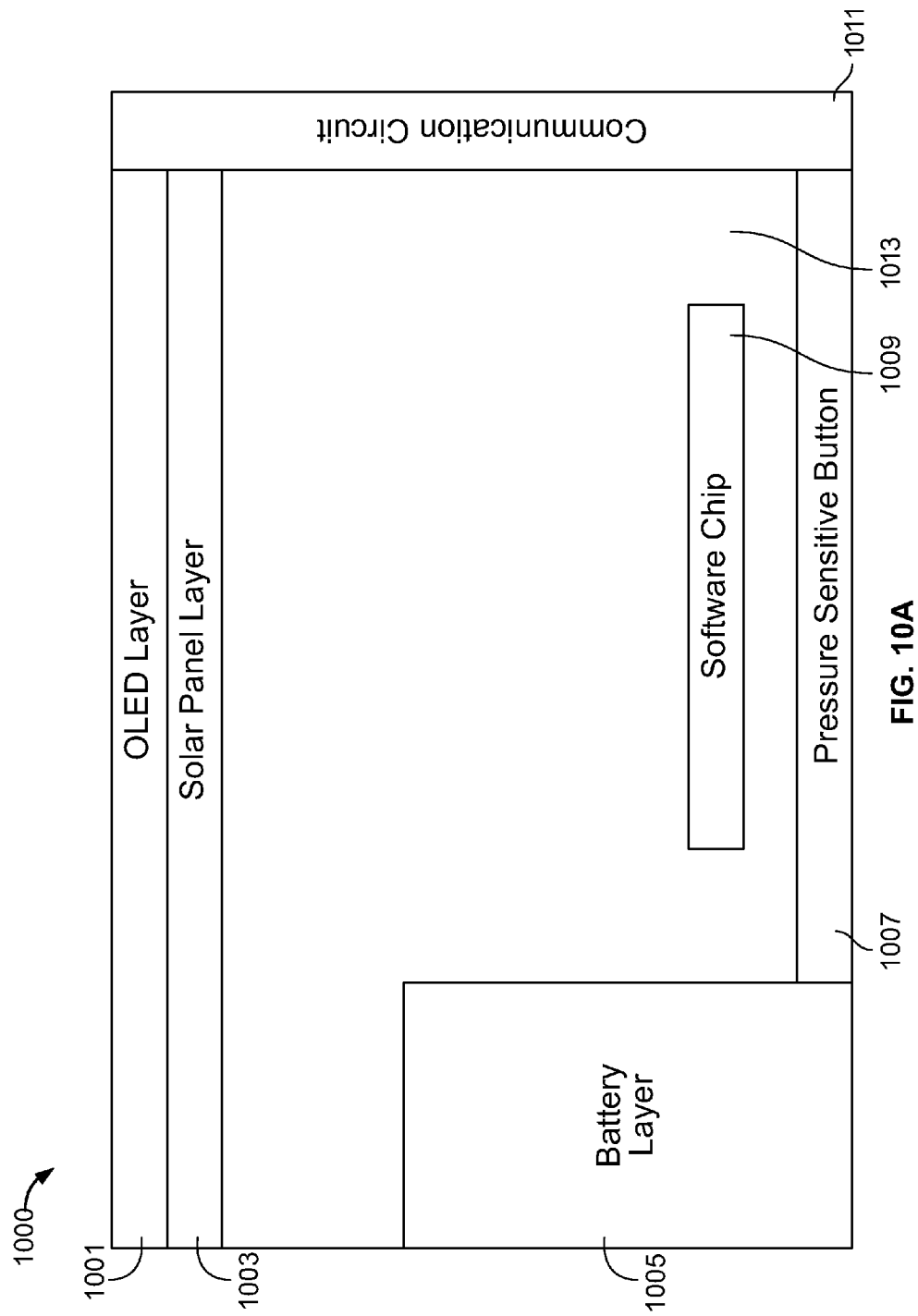
FIG. 10A shows a side view of a panel or smart card according to certain embodiments.

FIG. 10 shows an illustrative side view of a panel 1000 for use in a reader and display having one or more panels. Panel 1000 includes OLED layer 101. While the panel shown in FIGS. 10-18 preferably includes various components, it should be noted that, in a multi-panel framework, one or more of the components may be included in only of the multiple panels.

OLEDs may be used to form rollable and paper-thin displays. It should be noted that when the panels of the display and reader according to certain embodiments are relatively thin, the hinges formed between the panels preferably allow the panels to be folded such that the entire thickness of a folded reader and display having a two-panel thickness which may preferably be less than 2 mm. This may be especially relevant when contactless panels are in communication with a wireless chip 1011 as set forth below because communication with a smart card is preferably administered using the wireless chip and not an internally-mounted port.

Panel 1000 may include a touch sensor. The touch sensor may be not greater than 0.001 mm thick. In some embodiments, the touch sensor may be positioned about the OLED layer. In some embodiments, an OLED display may include an integrated touch sensor. Integrating the touch sensor into the OLED display may reduce reflectivity due to space between the touch sensor and the OLED display. Integrating a touch sensor into the OLED layer may increase visibility of the OLED display under direct sunlight.

Using OLED layer 1001 to display information may have several technical advantages. OLEDs may provide lower power consumption, wider viewing angles, better colors, higher contrast, operate in a wider temperature ranges and enable faster refresh rates than other display technology. In some embodiments, OLED displays may be fabricated directly on the control circuitry and may be completely solid state devices. OLED displays may only include trace amounts of heavy metals. Thus, OLED panels may be easily disposed of and recycled.

Panel 1000 includes solar panel layer 1003. OLED displays may be transparent when not in use. Thus when OLED layer 1001 is not illuminated, OLED layer 1001 maybe transparent. Sunlight may pass through OLED layer 1001 and reach solar panel layer 1003. Solar panel layer 1003 may convert the solar energy into electricity that powers one or more components of panel 1000. Solar panel layer 1003 may be thin enough to be flexible.

Panel 1000 includes battery 1005. Battery 1005 may be rechargeable. Battery 1005 may be flexible. Battery 1005 may be rechargeable by power generated by solar panel layer 1003. Battery 1005 may be rechargeable from a power source external to panel 1000.

Panel 1000 includes software chip 1009. Software chip 1009 may control overall operation of panel 1000 and its associated components. Software chip 1009 may include a non-transitory memory. Panel 1000 may include non-transitory memory locations (not shown) within thickness 1013. Software chip 1009 may access such memory locations. The non-transitory memory locations may store instructions, that when executed by software chip 1009, enable panel 1000 to perform various functions.

For example, memory locations may store software used by panel 1000, such as an operating system, application programs, and an associated database.

Panel 1000 includes wireless chip 1011. Wireless chip 1011 may provide panel 1000 with wireless communication functionality. Wireless chip 1011 may enable panel 1000 to communicate using a variety of communication protocols including, WiFi, Bluetooth, NFC and cellular telecommunications.

Panel 1000 also include pressure sensitive button 1007. Pressure sensitive button 1007 may be mechanically actuated. Actuation of pressure sensitive button 1007 may provide a signal to software chip 1009.

For example, mechanical actuation of pressure sensitive button 1007 may power on and/or power off software chip 1009. Mechanical actuation of pressure sensitive button 1007 may inform software chip 1009 of a user selection of choices displayed using OLED layer 1001.

FIG. 10 shows illustrative components 1001-1013 of panel 1000 in an arrangement within panel 1000. The arrangement shown in FIG. 10 is illustrative. Panel 1000 may include additional components not shown in FIG. 10, such as a biometric sensor. One or more of components 1001-1013 and any additional components may be arranged within panel 1000 in a suitable fashion. For example, pressure sensitive button may be located in space 1015 between OLED layer 1001 and solar panel layer 1003. OLED layer 1001 may flex or bend to allow a user to mechanically actuate pressure sensitive button 1007.

Some embodiments may not include all of components 1001-1013. For example, a panel may not include solar panel layer 1003 or pressure sensitive button 1007.

Figure 10B:
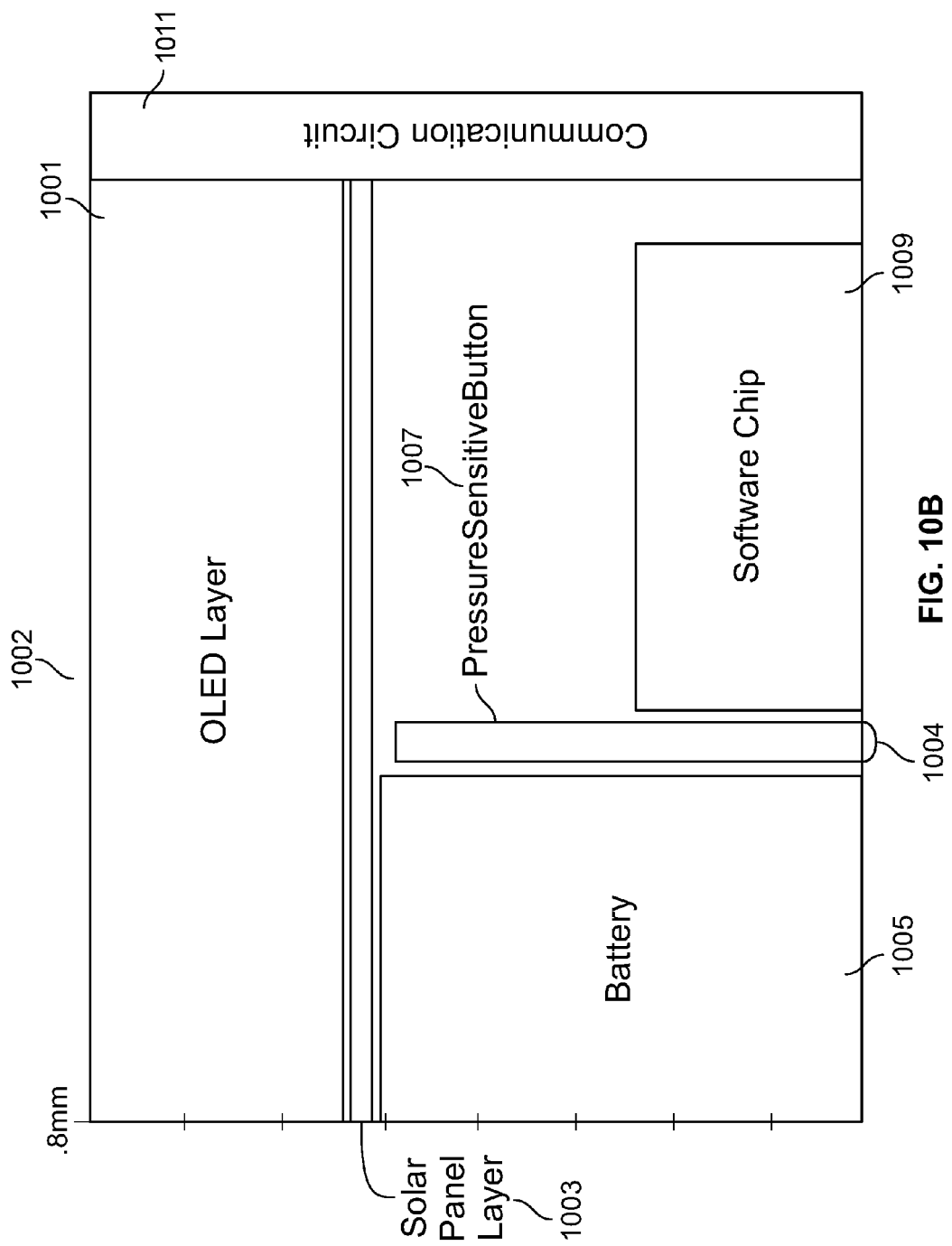
FIG. 10B shows another side view of a panel or smart card according to certain embodiments.

FIG. 10B shows another side view 1002 of a panel having a thickness of 0.8 mm. View 1002 shows a cut-away view along a thickness of an illustrative panel. View 1002 shows an arrangement of components within a panel having a thickness of 0.8 mm.

Figure 11:
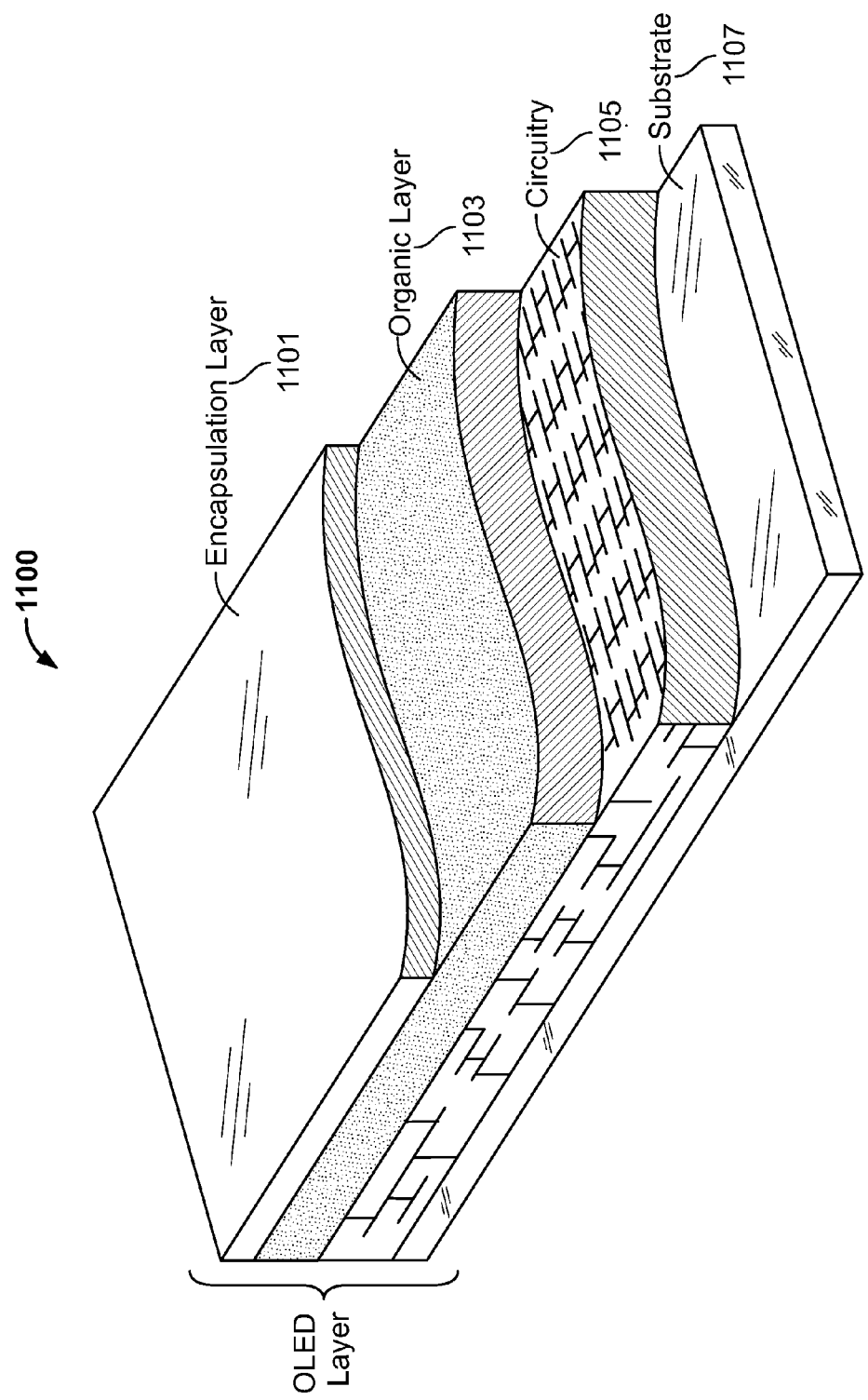
FIG. 11 shows structures associated with an illustrative OLED layer.

FIG. 11 shows structures 1100 of an illustrative OLED layer, such as OLED layer 1001. Structures 1100 include four layers: encapsulation layer 1101, organic layer 1103, circuitry layer 1105 and substrate layer 1107.

Encapsulation layer 1101 protects organic layer 1103 from exposure to oxygen, water and other contaminants. Preferably, encapsulation layer 1101 protects organic layer 1103, and is flexible and transparent. A common material for constructing encapsulation layer 1101 includes glass. When glass is used for encapsulation layer 1101, the glass may be very thin and flexible. For example, the glass may be between 50 micrometers ("um") and 100 um thick.

In some embodiments, encapsulation layer 1101 may be constructed using Thin-Film Encapsulation techniques such as Atomic Layer Deposition ("ALD"). ALD is a process that utilize chemicals that react to create a solid thin film.

Structures 1100 include organic layer 1103.

Organic layer 1103 typically includes an emissive solid-state semiconductor. For example, organic layer 1103 may include one or more light emitting diodes. Organic layer 1103 may be constructed from a thin film of organic (carbon-based) material. When electricity is applied to a diode within organic layer 1103, electrons flow through organic layer 1103 and release photons, thereby emitting light. Different types of emissive materials may be used. Each type of material may be associated with a different color light. An intensity of light emitted by organic layer 1103 may be controlled by the amount of electricity flowing through organic layer 1103.

Organic layer 1103 may be doped with "host" materials. Host material may affects properties, such as efficiency, of organic layer 1103. For example, organic layer 1103 may be doped with emitter materials that improve its operation and/or achieve a desired color.

Organic layer 1103 may include two or more sub-layers (not shown). For example, organic layer 1103 may include 5, 10 or 15 sublayers. The sub-layers may enhance an efficiency of the emissive layer. Illustrative sub-layers may include: (1) an electron transport layer, (2) a blocking layer, (3) an emissive layer, (4) a hole transport layer and an (5) injection layer.

In operation, an emissive layer may be placed between a cathode and an anode. When electricity is applied, electrons flow from the cathode to the anode. OLED devices are typically driven by current. The cathode inserts electrons into the emissive layer, and the anode removes electrons. The electron "flow" through the emissive layer releases photons generating light. The color of the generated light may be changed by using different types of materials for the emissive layer. An intensity of the generated light may be controlled by the amount of electricity applied.

A direction of light emitted by the organic layer may be controlled by transparency of the anode and cathode. In some embodiments, the cathode, positioned over a top of organic layer 1103 may be reflective. Such a cathode may be constructing using an aluminum based-compound or lithium fluoride. An anode positioned underneath organic layer 1103 may be transparent. A transparent anode may preferably be constructed using indium tin oxide. In such embodiments, light is then emitted through circuitry layer 1105 and substrate 1107. Such embodiments may be referred to as "bottom-emitting OLEDs."

In some embodiments, the cathode positioned over a top of organic layer 1103 may be transparent. Such a cathode may preferably be constructing using indium tin oxide. The anode may be reflective and positioned underneath organic layer 1103. The reflective anode reflects the light back through the transparent cathode. Typically, top-emitting designs are more efficient and are used to construct higher resolution displays.

Additionally, top-emitting designs may allow the organic layer to be formed on non-transparent substrates. Small- and medium-sized OLED displays are typically constructed using top-emitting techniques.

Organic layer 1103 may form one or more pixels. Different architectures are available for forming pixels. One architecture includes positioning different color (e.g., red, green and blue) diodes adjacent to each other. Another architecture includes stacking different color diodes on top of each other. Diodes may be stacked because materials used to construct OLED layer 1103 may be transparent. Stacked design may provide a smaller pixel size and higher resolution.

Structures 1100 include circuitry layer 1105. Circuitry layer 1105 includes electronics that drive one or more pixels formed within organic layer 1103. Typically, amorphous silicon (a-Si) and low temperature polysilicon (LTPS) are used to construct circuitry layer 1105. In some embodiments, circuitry layer 1105 may be transparent.

Substrate layer 1107 supports circuitry layer 1105, organic layer 1103 and encapsulation layer 1101. Substrate layer 1101 may be constructed using various materials. For example, substrate layer 1107 may be constructed using glass, plastic or metal materials. In some embodiments, substrate layer 1107 may function as encapsulation layer 1101.

Figure 12:
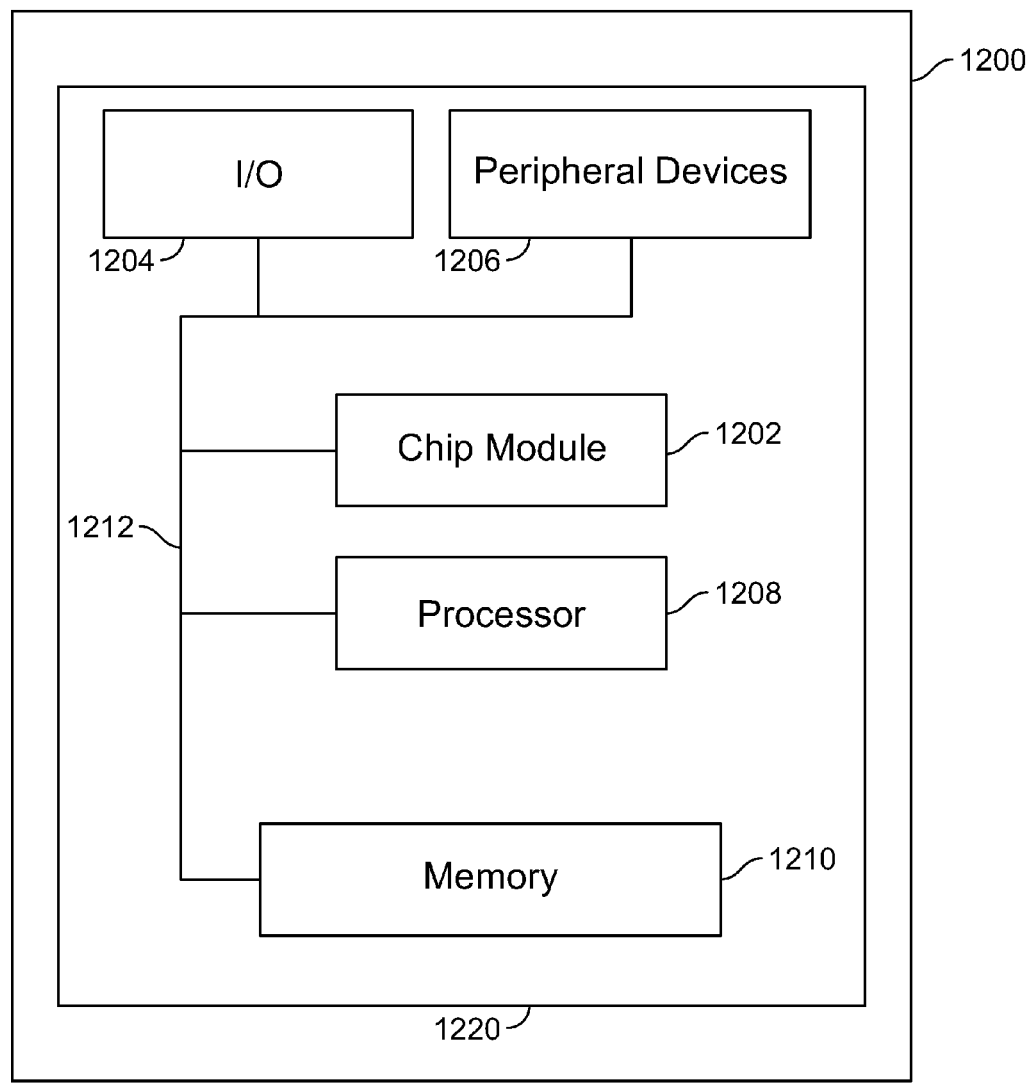
FIG. 12 shows an illustrative software chip for use with certain embodiments.

FIG. 12 shows an illustrative software chip 1200. Software chip 1200 may include chip module 1202, which may include one or more integrated circuits, and which may include logic configured to perform any suitable logical operation.

Software chip 1200 may include one or more of the following components: I/O circuitry 1204, which may include a transmitter device and a receiver device and may interface with a smart cards such as the smart cards shown in FIGS. 1-9. fiber optic cable, coaxial cable, telephone lines, wireless devices, PHY layer hardware, a keypad/display control device or any other suitable encoded media or devices; peripheral devices 1206, which may include counter timers, real-time timers, power-on reset generators or any other suitable peripheral devices; logical processing device 1208, which may compute data structural information 1210.

Machine-readable memory 1210 may be configured to store in machine-readable data structures: user account information, electronic signatures of biometric characteristics or any other suitable information or data structures.

Components 1202, 1204, 1206, 1208 and 1210 may be coupled together by a system bus or other interconnections 1212 and may be present on one or more circuit boards such as 1220. Furthermore, one or more of components 1202-1210 may be coupled to similar or different components in adjoining or remote panels. In some embodiments, the components may be integrated into a single chip. The chip may be silicon-based.

FIGS. 13-18 show illustrative layers that may be present within an illustrative panel.

Figure 13:
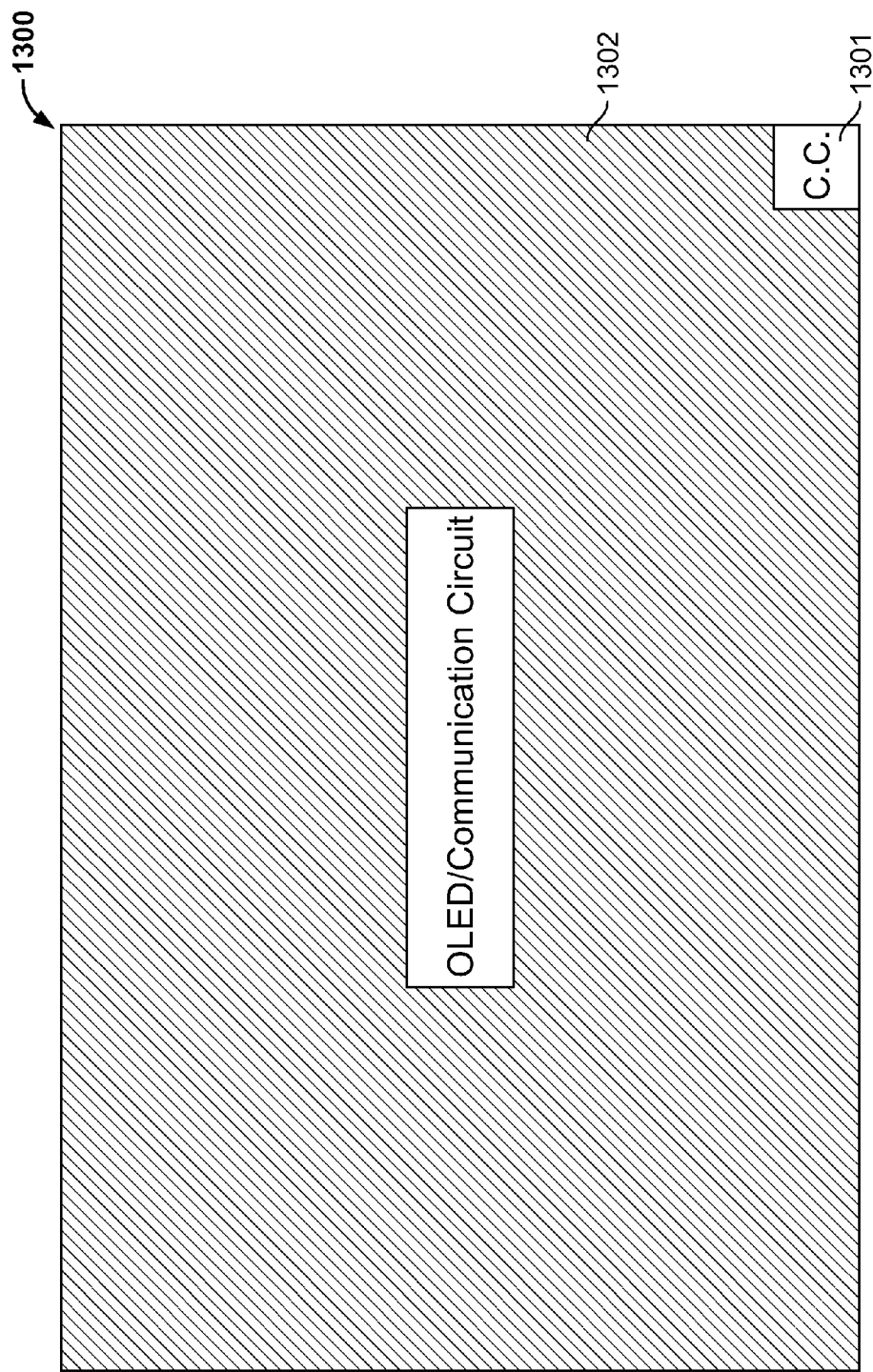
FIG. 13-18 shows illustrative layers that may be present within an illustrative smart card according to certain embodiments.

FIG. 13 shows illustrative layer 1302. Layer 1302 includes OLED layer (such as OLED layer 1100, shown in FIG. 11). FIG. 13B also shows that, in some embodiments, wireless communication circuit 1301 may penetrate layer 1302.

Figure 14:
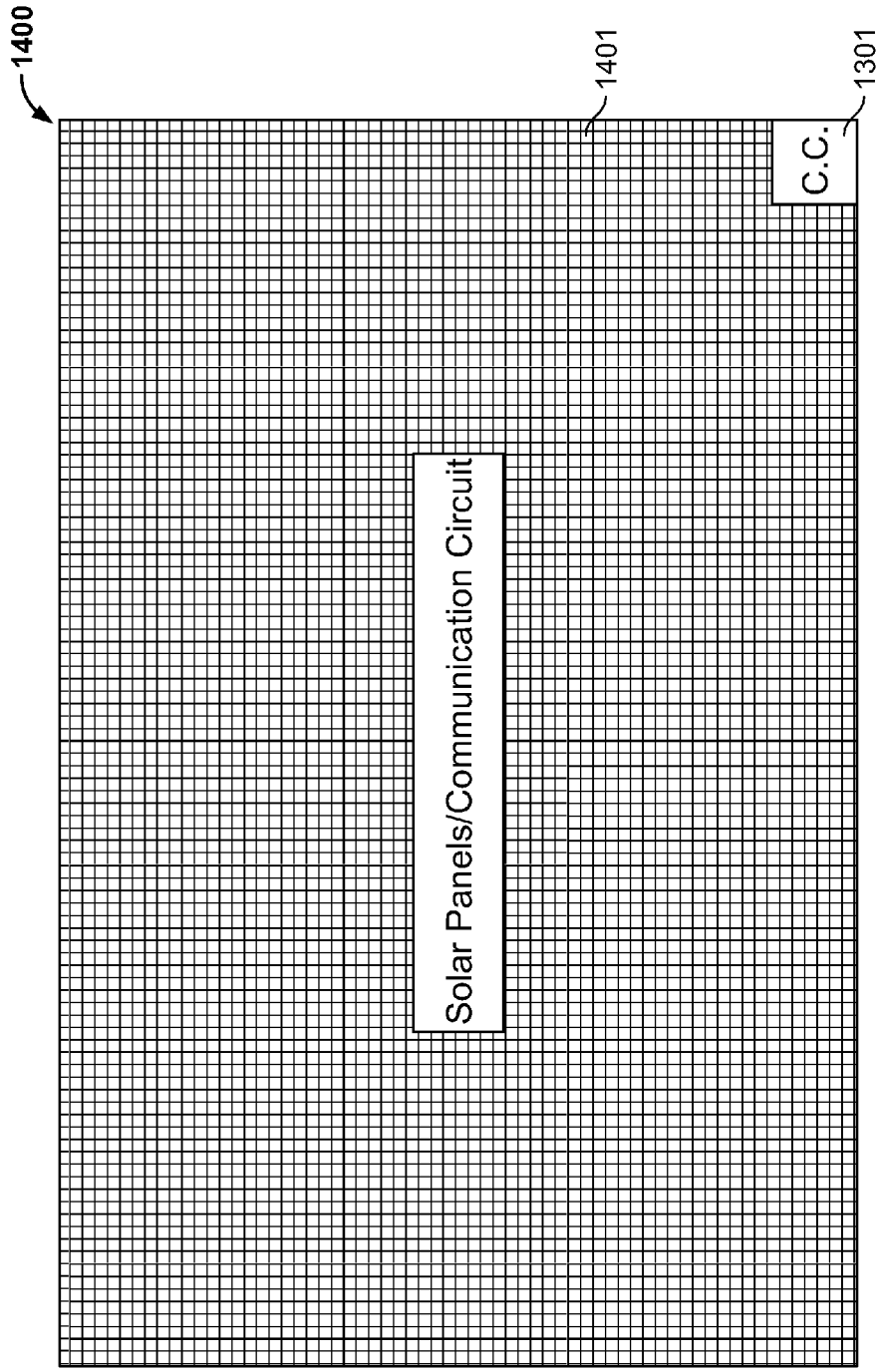

FIG. 14 shows illustrative layer 1400. Layer 1400 includes solar panels 1401 that may be used to power various components of a panel (e.g., circuitry layer 1105, shown in FIG. 11). FIG. 14 also shows that, in some embodiments, wireless communication circuit 1301 may penetrate into third layer 1400.

Figure 15:
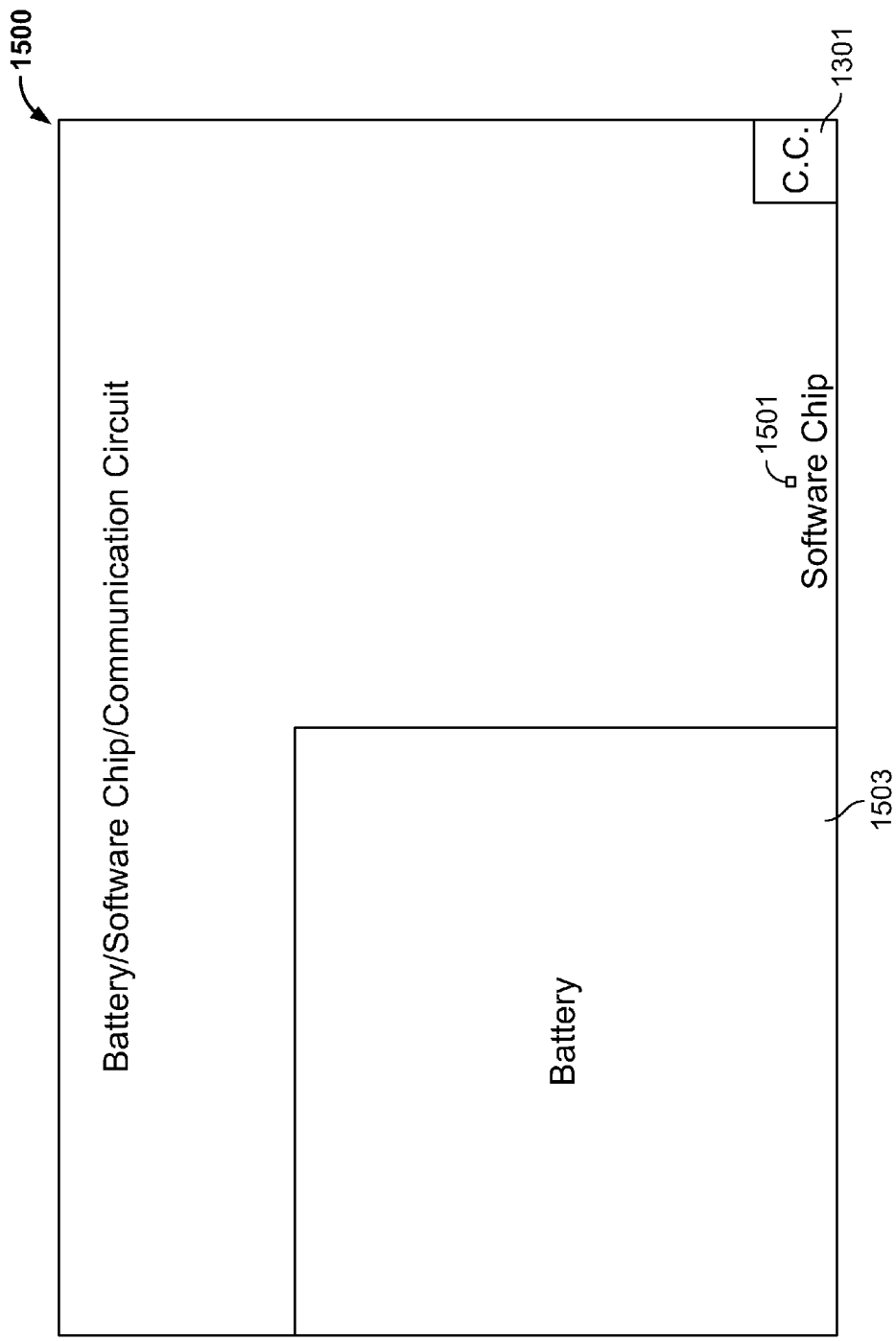

FIG. 15 shows illustrative layer 1500. Layer 1500 includes software chip 1501. Software chip 1501 may include one or more features of software chip 1009 (shown in FIG. 10). Fourth layer 1500 includes battery 1503. Battery 1503 may include one or more features of battery layer 1005

(shown in FIG. 10). FIG. 15 shows that, in some embodiments, wireless communication circuit 1301 may penetrate layer 1500.

Figure 16:
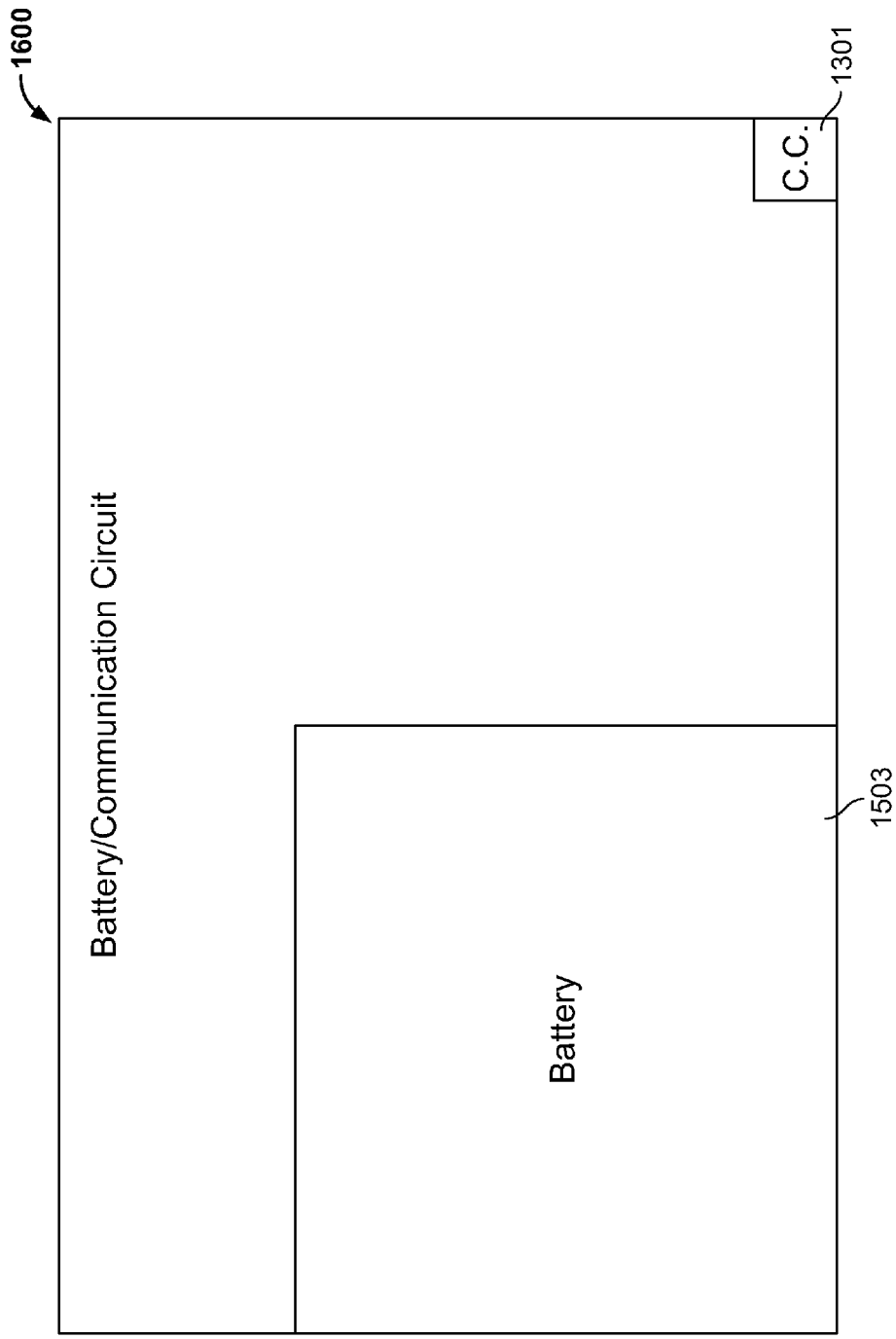

FIG. 16 shows illustrative layer 1600. FIG. 16 shows that that, in some embodiments, battery 1503 may penetrate layer 1600. FIG. 16 shows that, in some embodiments, wireless communication circuit 1301 may penetrate layer 1600.

Figure 17:
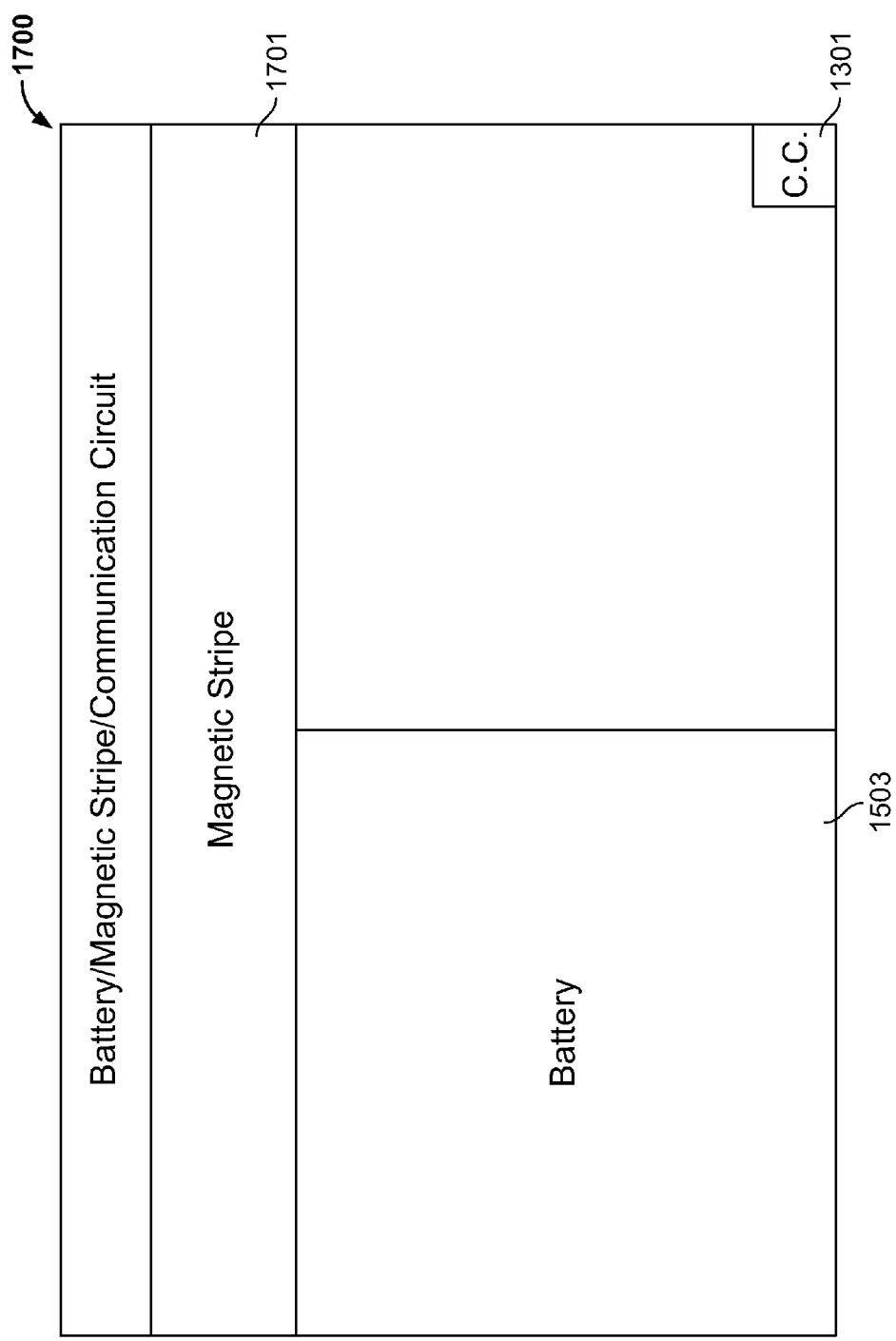

FIG. 17 shows illustrative layer 1700. FIG. 17 shows that, in some embodiments, battery 1503 may penetrate layer 1700. FIG. 17 shows that, in some embodiments, wireless communication circuit 1301 may penetrate layer 1700.

FIG. 17 shows that layer 1700 may include magnetic stripe 1701. Magnetic stripe 1701 may include magnetically encoded information. Magnetic stripe 1701 may provide backwards compatibility for panels described herein.

Figure 18:
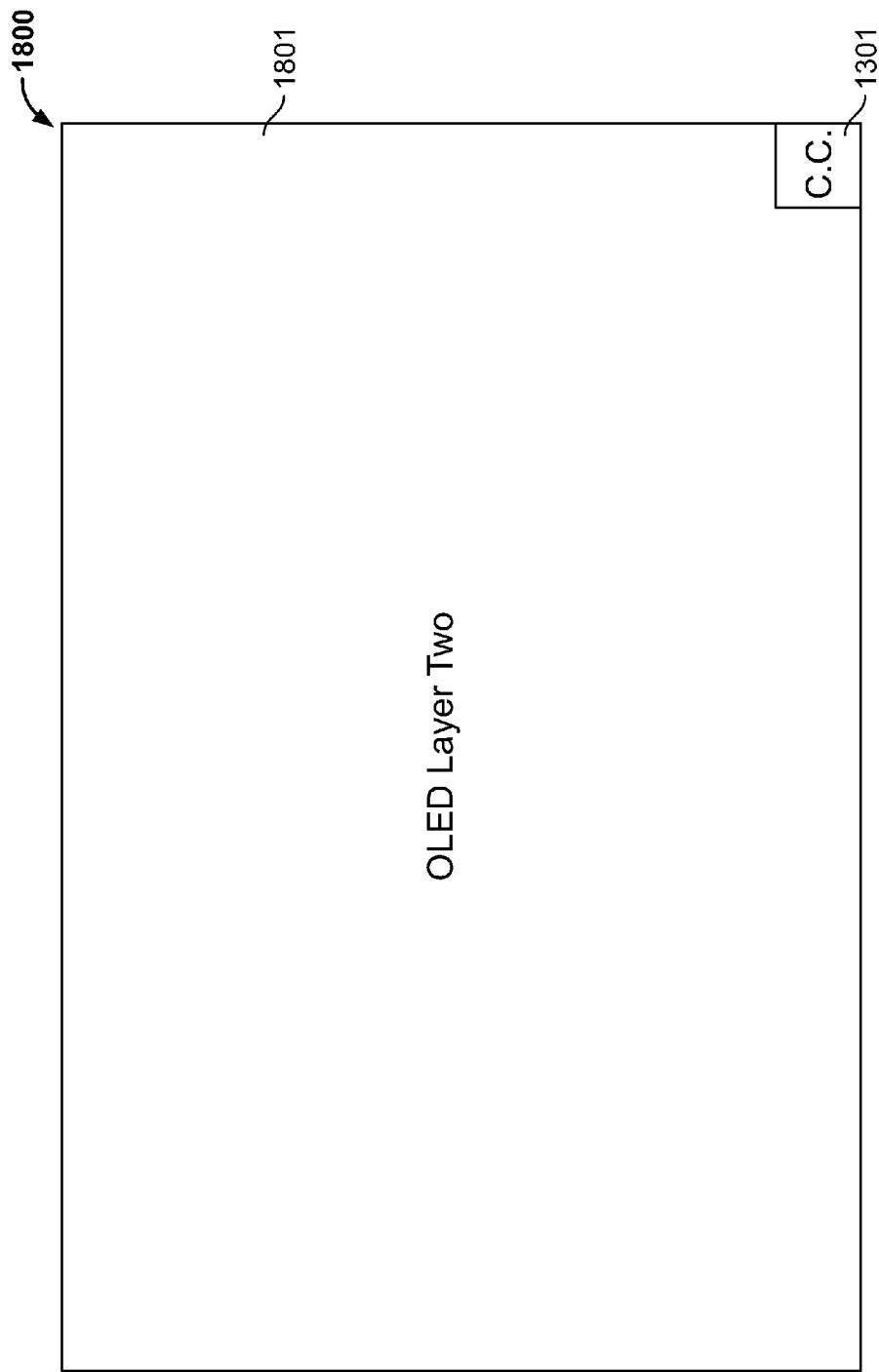

FIG. 18 shows illustrative layer 1800. Layer 1800 includes a second OLED layer 1801. Second OLED layer 1801 may include one or more features of OLED layer 1100 (shown in FIG. 11). Second OLED layer 1801 may allow a front and back of a panel to function as a display. FIG. 18 also shows that wireless communication circuit 1301 may penetrate layer 1800.

Thus, systems and methods for unfoldable, preferably OLED-based, readers and displays for the visually-impaired have been provided. Persons skilled in the art will appreciate that the present invention can be practiced by other than the described embodiments, which are presented for purposes of illustration rather than of limitation. The present invention is limited only by the claims that follow.

What is claimed is:

1. A smart card reader and display, said smart card reader for reading contact EMV-technology-equipped smart cards, said reader and display comprising:
   a plurality of panels, each of the panels comprising an array of organic light emitting diodes ("OLEDs") forming one or more pixels, each of the panels coupled to at least one other panel;
   a wireless chip;
   a software chip comprising a non-transitory memory and a processor; and
   a battery for powering the plurality of panels, the wireless device and the software chip;
   at least six contacts for contacting six smart card contacts, the at least six contacts located proximal an edge of the smart card reader and display, the six contacts comprising a first contact for contacting a power supply contact of a smart card, a second contact for contacting a reset contact of a smart card, a third contact for contacting a clock ("clk") contact of a smart card, a fourth contact for contacting a ground contact of a smart card, a fifth contact for contacting a programming voltage contact of a smart card, and a sixth contact for contacting a serial input and output contact of a smart card.

2. The reader and display of claim 1 further comprising at least one additional contact for contacting at least one auxiliary contact on a smart card.

3. The reader and display of claim 1 further comprising at least one contact EMV reader head selected from the group consisting of a pin type with card lock reader head and a sled type reader head.

4. The reader and display of claim 1, wherein the display is touch-sensitive, the reader and display further comprising push and pull technology which enables the user to enlarge and/or reduce a portion of the display of the smart card on the display in response to touch.

5. The reader and display of claim 1 wherein each of the plurality of panels is at least 85.60×53.98 mm.

6. The reader and display of claim 1 wherein the reader and display further comprise backlighting.

7. The reader and display of claim 6 wherein the backlighting is adjustable.

8. The reader and display of claim 1 wherein a contrast of the display is adjustable.

9. A smart card reader and display comprising:
   a plurality of panels, each of the panels comprising an array of organic light emitting diodes ("OLEDs") forming one or more pixels, each of the panels coupled to at least one other panel;
   a wireless chip, said wireless chip configured to enable communication with a contactless smart card;
   a software chip comprising a non-transitory memory and a processor; and
   a battery for powering the plurality of panels, the wireless chip and the software chip.

10. The reader and display of claim 9 further comprising at least one contact EMV reader head selected from the group consisting of a pin type with card lock reader head and a sled type reader head.

11. The reader and display of claim 9, wherein the display is touch-sensitive, the reader and display further comprising push and pull technology which enables the user to enlarge and/or reduce a portion of the display of the smart card on the display in response to touch.

12. The reader and display of claim 9, wherein each of the plurality of panels is at least 85.60×53.98 mm.

13. The reader and display of claim 9 wherein the reader and display further comprise backlighting.

14. The reader and display of claim 13 wherein the backlighting is adjustable.

15. The reader and display of claim 9 wherein a contrast of the display is adjustable.

16. The reader and display of claim 9 further comprising an externally-mounted slot for receiving the contactless smart card.

* * * * *